United States Patent [19]

Harris

[11] Patent Number: 4,899,828

[45] Date of Patent: Feb. 13, 1990

[54] GROUND AERATION DEVICE

[76] Inventor: Clark R. Harris, 1919-104 Street, Edmonton, Alberta, Canada, T6J 5M2

[21] Appl. No.: 149,630

[22] Filed: Jan. 28, 1988

[51] Int. Cl.[4] .............................................. A01B 45/02
[52] U.S. Cl. .......................................... 172/21; 56/249
[58] Field of Search ........................... 172/21, 22, 554; 56/249

[56] References Cited

U.S. PATENT DOCUMENTS

| 2,085,113 | 6/1937 | Miller | 56/249 |
| 2,231,821 | 2/1941 | Sprouse | 56/249 |
| 2,483,846 | 10/1949 | Roche | 56/249 |
| 2,722,795 | 11/1955 | Warner | 56/249 |
| 2,801,512 | 8/1957 | Karaktin | 172/21 |
| 3,148,737 | 9/1964 | Lunsford | 172/21 |
| 3,794,121 | 2/1974 | Drozak | 172/21 |
| 4,192,387 | 3/1980 | Stinson | 172/21 |
| 4,420,189 | 12/1983 | Ruden | 37/117.5 |
| 4,619,329 | 10/1986 | Gorbett | 172/21 |

FOREIGN PATENT DOCUMENTS

| 341389 | 5/1934 | Canada . |
| 662879 | 5/1963 | Canada . |
| 1092878 | 1/1981 | Canada . |
| 1135109 | 11/1982 | Canada . |
| 1173285 | 8/1984 | Canada . |

Primary Examiner—Richard J. Johnson
Attorney, Agent, or Firm—Davis, Bujold & Streck

[57] ABSTRACT

There is disclosed a ground aeration device which forces aeration spikes into the soil without requiring ballast weight. The aeration device is comprised of a cylindrical roller having a plurality of spikes projecting therefrom, the spikes being aligned in a helical row which extends once around the circumference of the roller; support arms having the roller rotatably secured to one end; and mounting brackets which are adapted to mount the opposed ends of the support arms to the front of a lawn mower, the support arms being oriented toward the ground at an angle of between 30 and 60 degrees in relation to the horizon such that the spikes of the roller penetrate the underlying groundsurface.

19 Claims, 8 Drawing Sheets

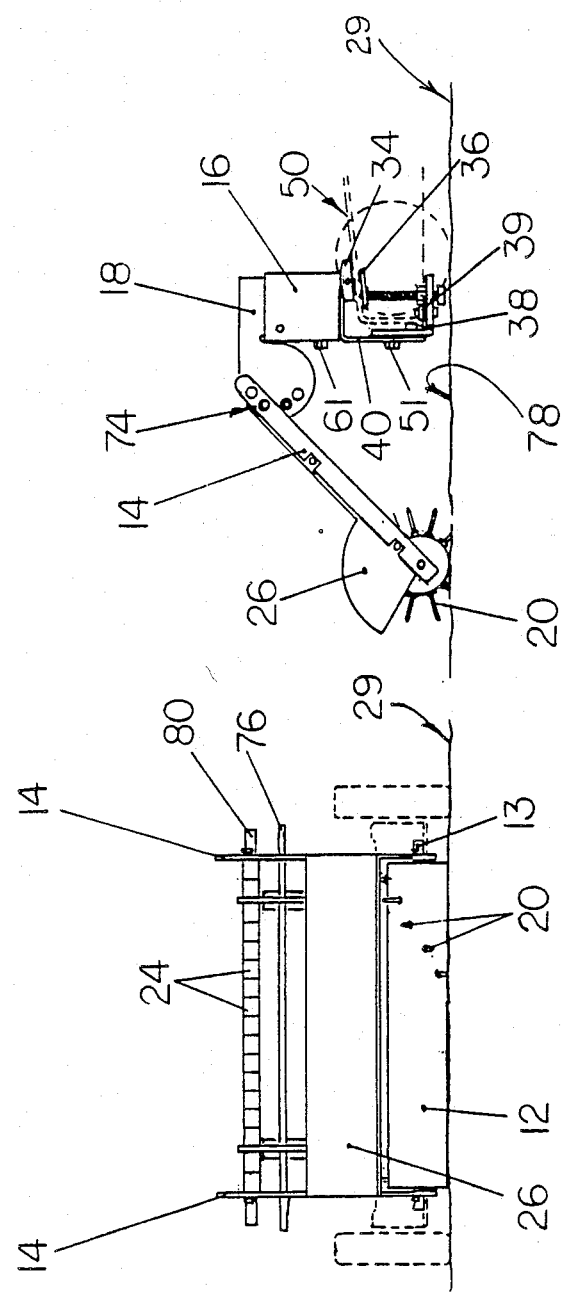

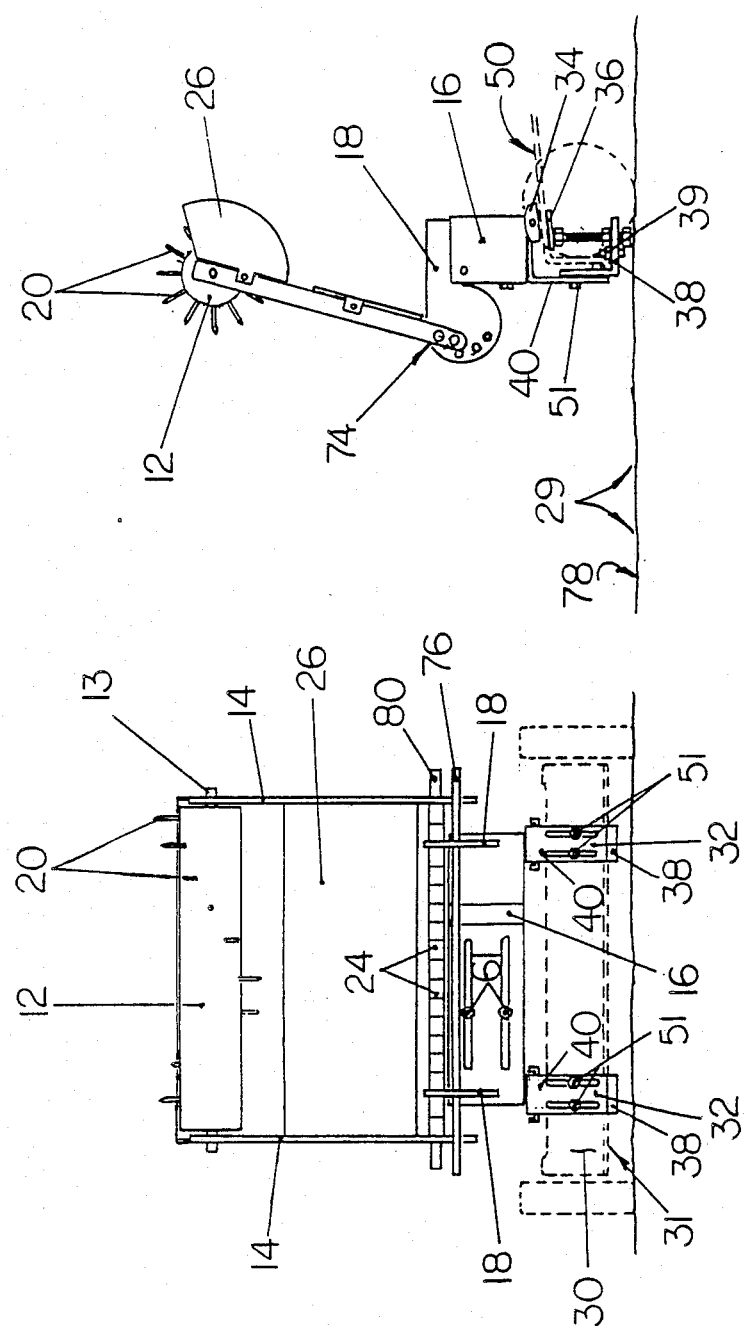

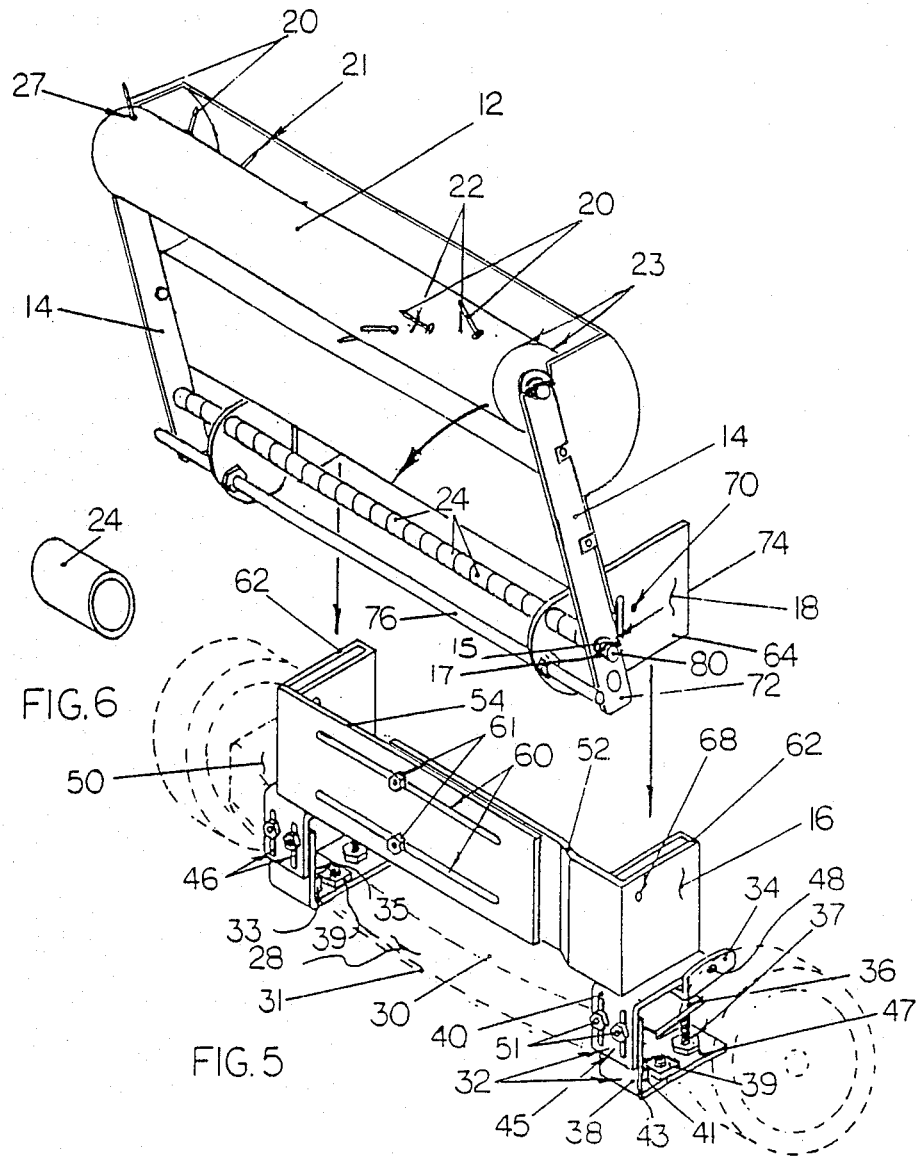

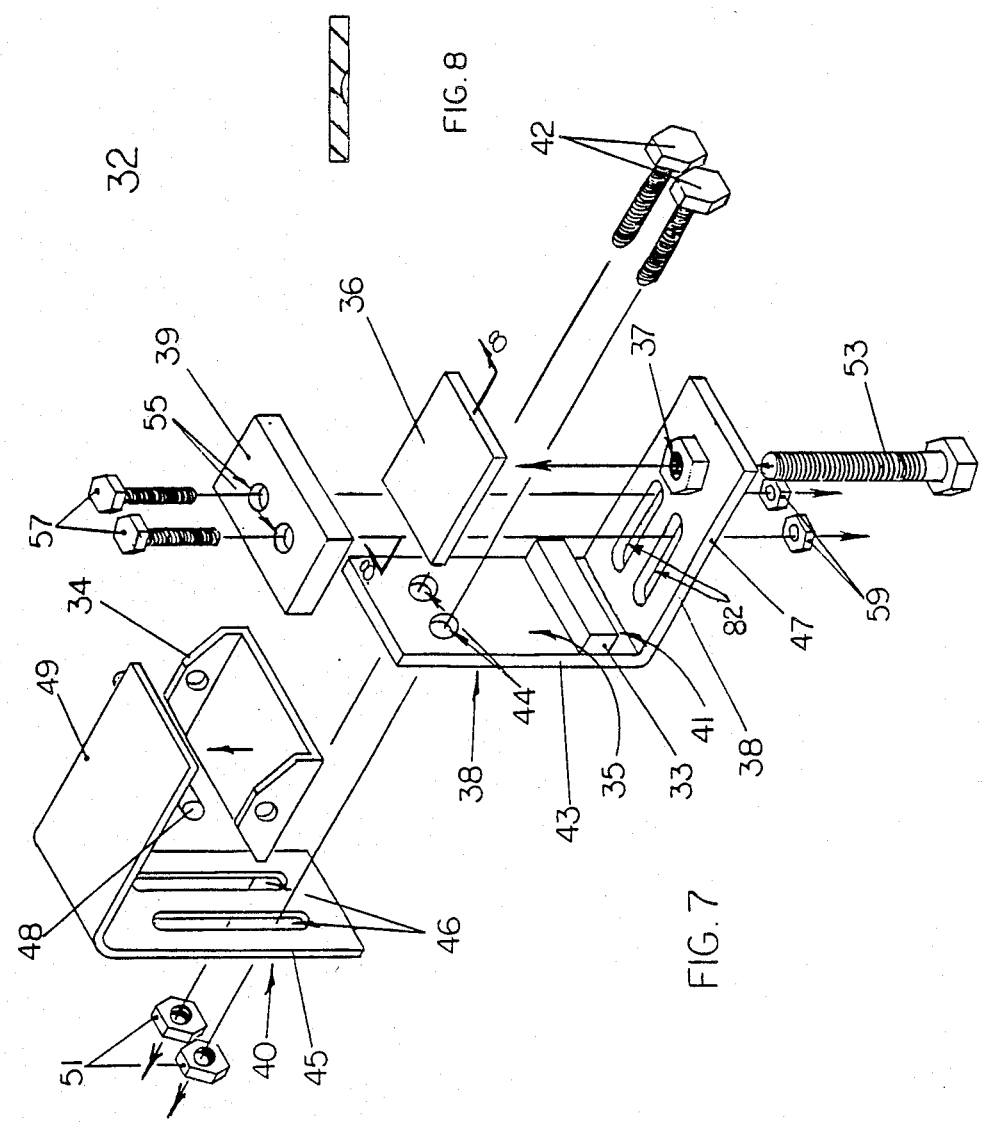

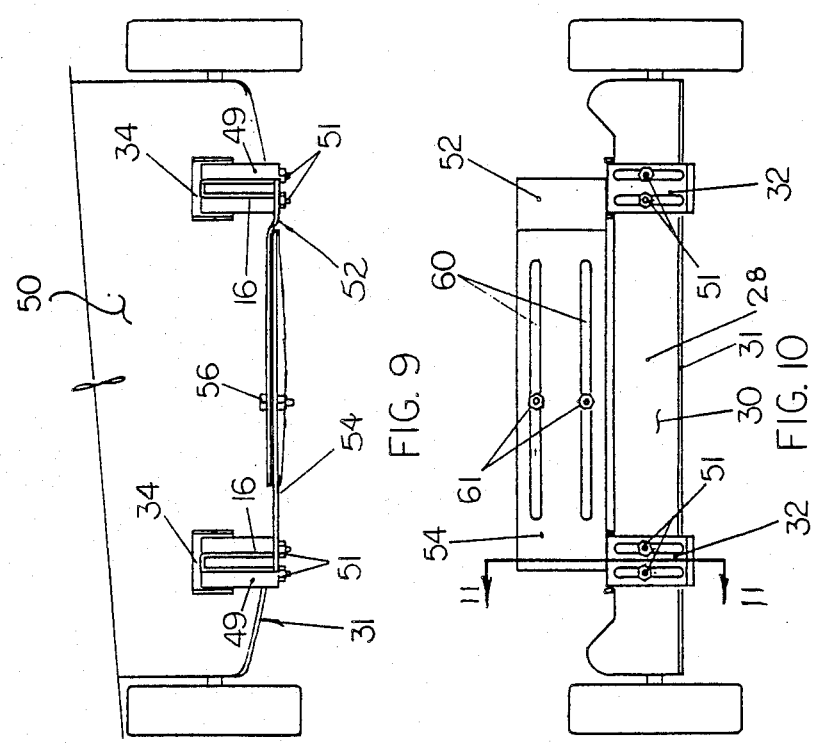

GROUND AERATION DEVICE

The present invention relates to a ground aeration device.

BACKGROUND OF THE INVENTION

Ground aeration is the process of improving the circulation of air into the soil. Agronomists and horticulturists emphasize the role oxygen plays in the development of plant life. In order to be fertile, soil must contain an abundance of oxygen to allow roots to breathe, and stimulate the development of microorganisms and the decomposition of organic matter. As a result of roots breathing and the decomposition of organic matter, carbon dioxide is released and becomes part of the soil atmosphere. When it rains, carbon dioxide dissolves in water to form carbonic acid which reacts with the soils minerals and chemicals to form soluble plant food.

Existing ground aeration devices have a plurality of spikes attached to large drums. As the drums are rotated the spikes penetrate the soil leaving a passage permitting oxygen in the air access to the roots of the grass. The aeration devices are, without exception, weighted in order to provide a sufficient downward thrust to force the spikes to penetrate the surface of the soil. By reason of their weight the prior art aeration devices are usually difficult to move manually, and, as a result, the majority have a motor to propel them forward.

The disadvantages of these devices are that their weight makes them cumbersome to use, and by virtue of this weight they tend to compact the soil, especially in moist soil conditions, whichis counterproductive to the intended purpose.

SUMMARY OF THE INVENTION

The primary object of the present invention is to overcome the disadvantage of the prior art by forcing aeration spikes into the soil without the use of ballast weight.

Broadly, the present invention provides an aeration device which is comprised of a cylindrical roller having a plurality of spikes protecting therefrom, the spikes being aligned in a helical row which extends once around the circumference of the roller; support arms having the roller rotatably secured to one end; and mounting brackets which are adapted to mount the opposed ends of the support arms to the front of a wheeled trolley, the support arms being oriented toward the ground at an angle of between 30 and 60 degrees in relation to the horizon such that the spikes of the roller penetrate the underlying groundsurface.

BRIEF DESCRIPTION OF THE DRAWINGS

These and other features of the invention will become more apparent from the following description in which reference is made to the appended drawings, wherein:

FIG. 1 is a frontal view of a preferred embodiment of the invention in an operative position.

FIG. 2 is a side plan view of a preferred embodiment of the invention in an operative position.

FIG. 3 is a frontal view of a preferred embodiment of the invention in a transport position.

FIG. 4 is a side plan view of a preferred embodiment of the invention in a transport position.

FIG. 5 is an exploded perspective view of a preferred embodiment of the invention.

FIG. 6 is a detail view of a portion of a preferred embodiment of the invention.

FIG. 7 is an exploded perspective view of a portion of a preferred embodiment of the invention.

FIG. 8 is a section view of a portion of a preferred embodiment of the invention taken along section lines A—A of FIG. 7.

FIG. 9 is a top plan view of a portion of a preferred embodiment of the invention.

FIG. 10 is a frontal view of a portion of a preferred embodiment of the invention.

DETAILED DESCRIPTION OF THE INVENTION

Figure 11:
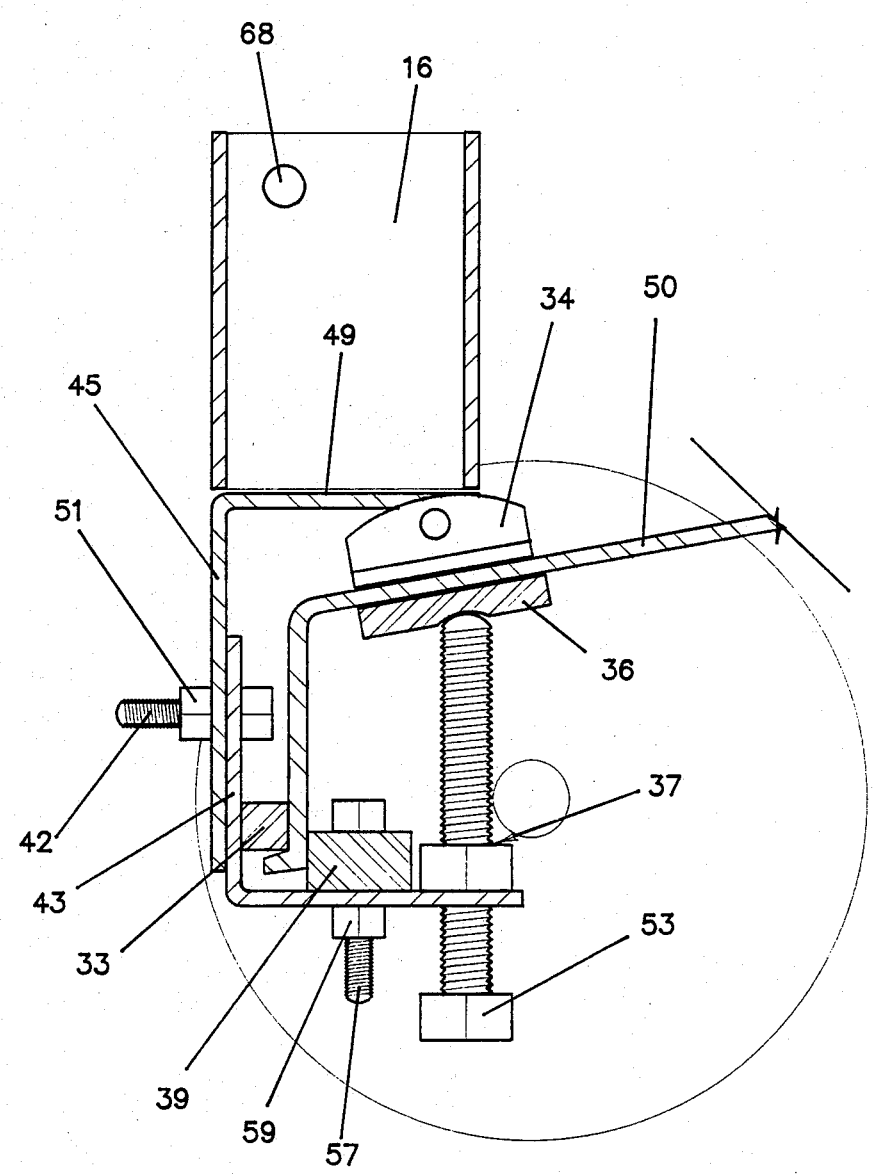
FIG. 11 is a section view of a portion of a preferred embodiment of the invention, taken along section lines B—B of FIG. 10.

The preferred embodiment of the invention hereinafter described is a ground aeration device, generally indicated by reference numeral 10, and illustrated in FIGS. 1 through 14. The primary components of ground aeration device 10 are cylindrical roller 12, support arms 14, and mounting members 16 and 18.

Figure 13:
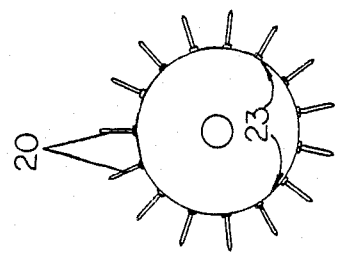
FIG. 13 is a frontal view of a portion of a preferred embodiment of the invention.
Figure 12:
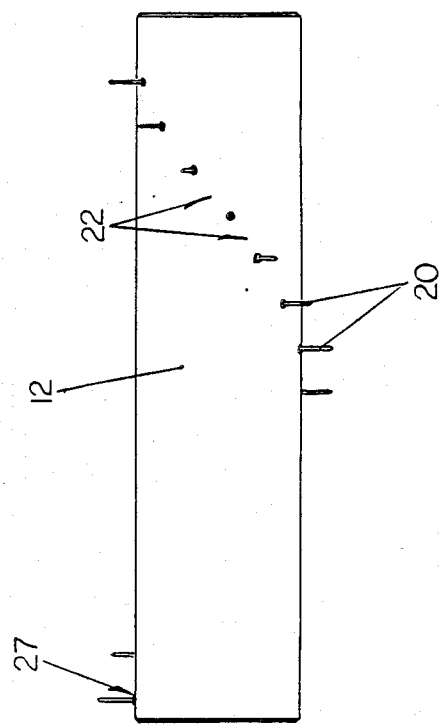
FIG. 12 is a frontal view of a portion of a preferred embodiment of the invention.
Figure 14:
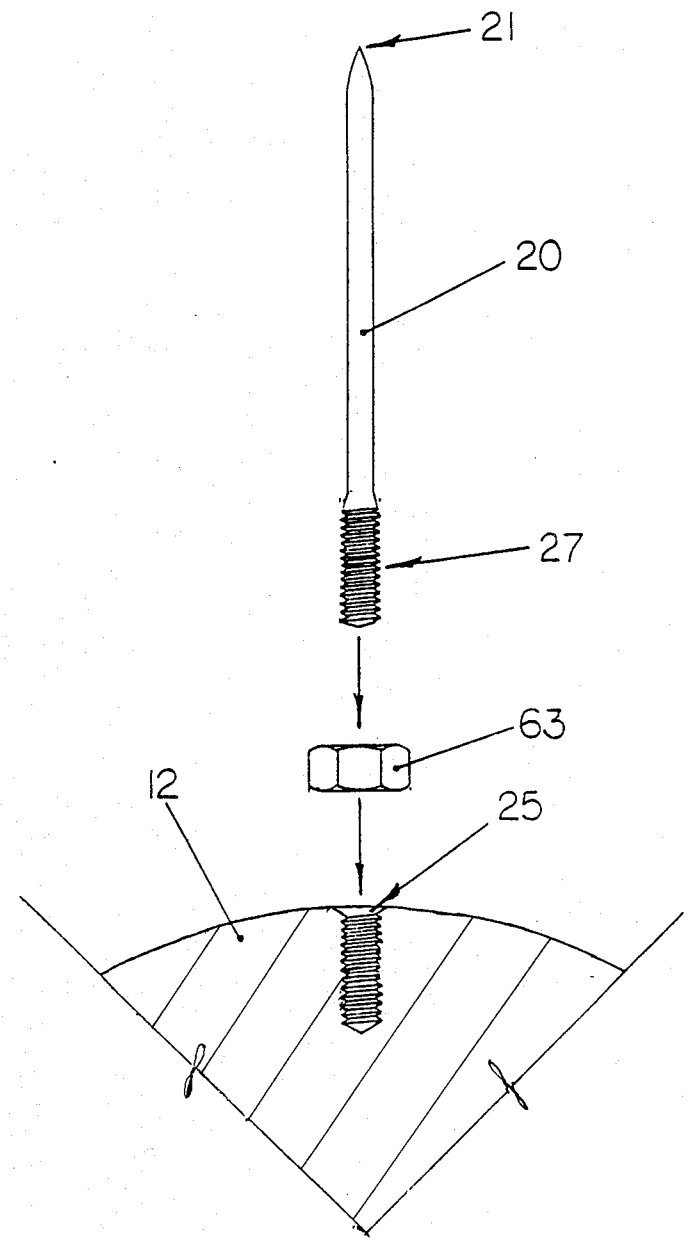
FIG. 14 is an exploded detail view of a portion of a preferred embodiment of the invention.

Cylindrical roller 12 has a plurality of spikes 20 which project outwardly. When ballast weight is removed from the design of ground aeration device 10, spikes 20 tend to bounce along the top of groundsurface 78 rather than penetrating as is intended. To prevent this from occurring spikes 20 are aligned in a helical row 22 which extends once around the circumference 23 of roller 12, as best illustrated in FIGS. 12, 13 and 14. Helical row 22 has been found to promote a smooth transition in the penetration of adjoining spikes 20 as roller 12 advances. Spikes 20 are pointed at one end 21 and are threaded at the opposed end 27 in order that they may be screwed into threaded openings 25 integrally formed in roller 12 and locked in position by nuts 63.

Support arms 14 have a shaft 13 extending between them. Roller 12 is rotatably mounted to shaft 13 and secured in position by washer 15 and cotter pin 17 which extends through an opening (not shown) in shaft 13, as illustrated in FIG. 5. A protective guard 26 attached to support arms 14 extends over roller 12 to diminish the possibility of someone becoming impaled on spikes 20.

There are a variety of ways in which a mounting bracket can be adapted to permit the mounting of roller 12 on a lawm mower 30. The mounting members 16 and 18 hereinafter described were developed in an attempt to permit multiple adjustment such that roller 12 can be mounted on a variety of makes and models of lawn mower. While it is envisaged that aeration device 10 would be mounted on a lawn mower 30, one skilled in the art will understand that mounting may be made to any wheeled trolley capable of movement over groundsurface 78.

A first mounting member 16 is adapted to be secured to the front end 28 of a lawn mower 30, as illustrated in FIGS. 5 through 11. First mounting member 16 has two "C" clamps 32 with a pivoting upper contact member 34 and a moveable lower contact member 36 to permit attachment to lawn mower 30. Lower contact member 36 is movable by means of a threaded bolt 53 which is accommodated in threaded opening 37. "C" clamps 32 are constructed of two "L" shaped sections 38 and 40. Section 38 has two arms 43 and 47. Section 40 has two arms 45 and 49. Arm 43 of section 38 and arm 45 of section 40 are secured together by nuts 51 and bolts 42. Bolts 42 are accommodated in holes 44 in arm 43 of section 38, and slots 46 in arm 45 of section 40. The relative distance between upper contact member 34 and lower contact 36 member is adjustable by temporarily loosening nuts 51 on bolts 42 and moving bolts 42 along slots 46 of section 40 thereby altering the relative positioning of sections 38 and 40. Upper contact members 34 pivot on pin 48 in order to engage and conform to the slope of exterior surface 50 at front end 28 of lawn mower 30. Most makes of lawn mower 30 have a lip 31 which protrudes from front end 28. In order to use this lip 31 to further stabilize first mounting member 16, lip 31 in accommodated in opening 41 in "C" clamp 32. Opening 41 is defined by a shoulder 33 on inside surface 35 of arm 43 of section 38 which serves as one wall of opening 41 with the second arm 47 of section 38 serving as the other wall. Arm 47 of section 38 also has a pair of parallel slots 82 which serve as a guide to permit lateral movement of clamping member 39 in relation to shoulder 33 to clamp lip 31 in opening 41. Clamping member 39 is secured to arm 47 of section 38 by bolts 57 which extend through holes 55 in clamping member 39 and through slots 82 in arm 47 and are secured in position by nuts 59. First mounting member 16 comes in two section 52 and 54 which are secured together by nuts 61 and bolts 56. Bolts 56 are accommodated in holes 58 in section 52, and slots 60 in section 54. The relative distance between "C" clamps 32 is adjustable by temporarily loosening nuts 61 on bolts 56 and moving bolts 56 along slots 60 of section 54 thereby altering the relative positioning of sections 52 and 54. Each of sections 52 and 54 of first mounting member 16 has a vertically extending female coupling 62 for coupling first mounting member 16 together with second mounting member 18.

Second mounting member 18 has two male couplings 64 which are adapted to be received in female couplings 62 of first mounting member 16. Once in position male couplings 64 may be locked in position by inserting a locking pin such as a cam-lock safety pin (not shown) through opening 68 of first mounting member 16 and aligned opening 70 of second mounting member 18. The opposed ends 72 of support arms 14 are pivotally attached to the ends 74 of second mounting member 18 on shaft 80, such that roller 12 may be moved from an operative position wherein spikes 20 engage groundsurface 78 to a transport position wherein spikes 20 are removed from groundsurface 78. Shaft 80 has a plurality of spacers 24, which maintain the relative positioning of arms 14 to mounting members 18. Second mounting member 18 has a secondary shaft 76 which obstructs the path of travel of support arms 14 serving as a stop means to maintain support arms 14 in a preselected operative position. Secondary shaft 76 orients support arms 14 toward groundsurface 78 at a preselected angle of between 30 and 60 degrees in relation to the horizon 29 such that spikes 20 of roller 12 penetrate underlying groundsurface 78. The selected angle of support arms 14 in relation to the horizon 29 of groundsurface 78 is of importance. If the angle is too serve, the lawn mower becomes difficult to push. If the angle is too shallow spikes 20 do not achieve good penetration. The optimum range has been found to be between 30 and 60 degrees, with the recommended setting being 60 degrees. At 60 degrees the lawn mower remains manueverable and close to maximum penetration is achieved by spikes 20.

In order to use ground aeration device 10, an operator must first secure first mounting member 16 to lawn mower 30. This is accomplished by attaching "C" clamps 32 to front end 28 of a lawn mower 30. Upper contact member 34 of eachof "C" clamps 32 is placed against exterior surface 50 at front end 28 of lawn mower 30 and pivoted on pin 48 in order to conform to the slope of exterior surface 50. Lip 31 of lawn mower 30 is inserted into opening 41 between shoulder 33 and arm 47 of section 38 of "C" clamp 32. Clamping member 39 is then moved laterally along parallel slots 82 and secure by nuts 59 and bolts 57 to clamp lip 31 in opening 41. Bolt 53 is then secured in threaded opening 37 until front end 28 of lawn mower 30 is clamped between upper contact member 34 and lower contact member 36.

With some models of lawn mower 30 the positioning of lip 31 may require a further adjustment to "C" clamps 32 to alter the relative distance between upper contact member 34 and lower contact 36 member. This is accomplished by loosening nuts 51 on bolts 42 and moving bolts 42 along slots 46 of section 40 thereby altering the relative positioning of sections 38 and 40.

With some models of lawn mower 30 the relative distance between "C" clamps 32 must be altered in order to find a position at front end 28 of lawn mower 30 where there is room to accommodate "C" clamps 32. This adjustment is made by loosening nuts 61 on bolts 56 and moving bolts 56 along slots 60 of section 54 thereby altering the relative positioning of sections 52 and 54.

Once first mounting member 16 is firmly secured to lawn mower 30, it can be left on lawm mower 30 at all times. When the operator wishes to use ground aeration device 10 second mounting member 18 can be affixed to first mounting member 16 by inserting male couplings 64 of second mounting member 18 into female couplings 62 of first mounting member 16 and locking members 16 and 18 together by inserting a cotter pin 66 through opening 68 of first mounting member 16 and aligned opening 70 of second mounting member 18. Support arms 14 may then be pivoted on shaft 80 to a transport position while the lawn mower 30 is being pushed from the place the installation was performed to the intended work site. Once at the work site, support arms 14 are pivoted on shaft 80 forward from the transport position until secondary shaft 76 stops the path of travel of support arms 14 to maintain support arms 14 in the preselected operative position of 60 degrees in relation to the horizon 80 with spikes 20 engaging groundsurface 78.

As the operator pushes lawn mower 30 in a forward direction in the helical row 22 of spikes 20 promotes a smooth transition in the penetration of adjoining spikes 20 as roller 12 advances. Only one of spikes 20 is at full penetration into ground surface 78 at any one time as helical row 22 extends only once around the circumference 23 of roller 12. Upon forward movement of lawn mower 30, support arms 14 exert a force forward and downward which is sufficient to cause roller 12 to rotate on shaft 13 and also to cause penetration of such of spikes 20 as may be in communication with groundsurface 78 at any particular point of rotation of roller 12.

One of the unique features of the present invention is that once the first of spikes 20 enters groundsurface 78, the other spikes tend to follow into ground surface 78. This is an improvement over the prior art where spikes tended to bounce along rather than penetrate groundsurface 78, and is made possible by the configuration of spikes 78 in a helical row 22. Another unique feature of the invention is the cooperation between the angle of arms 14 and the configuration of spikes 20 which permit penetration of groundsurface 78 without use of a heavy weight as was required by the prior art. The use of helical row is to ensure that only one spike is starting to penetrate groundsurface 78 at any one time, the other spikes being either already engaged with groundsurface 78 or completely disengaged. This desirable effect is defeated if helical row 22 is wound around circumference 23 of roller 12 more than once so that a number of spikes are penetrating groundsurface 78 at once, or if spikes 20 are so closely spaced that they are incapable of individually penetrating groundsurface 78. The spacing of spikes 20 is subject to a degree of experimentation depending upon the diameter and length of roller 12 used. In the proto-type roller 12 was built with a three inch diameter. The spacing between spikes 20 was 1 inch if measured lengthwise along roller 12 and 1¼ inch if measured along helical row 22.

It will be apparent to one skilled in the art that modifications may be made to the preferred embodiment without departing from the substance of the invention. In particular, helical row 22 may be extended to slightly more than once around the circumference 23 of roller 12. If such an extension to helical row 22 were to be made by trial and error a device could be developed which would still be operable.

The embodiments of the invention in which an exclusive property or privilege is claimed are defined as follows:

1. A ground aeration device, comprising:
   a. a cylindrical roller having a plurality of spikes projecting therefrom, said spikes being aligned in a helical row which extends substantially once around the circumference of said roller;
   b. support arms having said roller rotatably secured to one end;
   c. mounting brackets which are adapted to pivotally mounted the opposed ends of said support arms to the front of a wheeled trolley such that the forward motion of the trolley forces said spikes of said roller to penetrate the underlying ground surface, said support arms being oriented toward the ground at an angle of between 30 and 60 degrees in relation to the horizon, (such that said spikes of said roller penetrate the underlying ground surface).

2. The ground aeration device as defined in claim 1, said wheeled trolley being a lawn mower.

3. The ground aeration device as defined in claim 1, having a protective guard attached to said support arms extending down to form a shield over said roller.

4. The ground aeration device as defined in claim 2, having at least two "C" clamps with upper and lower contact members to permit attachment of said mounting bracket to said lawn mower.

5. The ground aeration device as defined in claim 4, having pivotally adjustable upper contact members which engage and conform to the slope of the exterior surface of said lawn mower.

6. The ground aeration device as defined in claim 4, having means for lateral adjustment of the relative distance between said "C" clamps.

7. The ground aeration device as defined in claim 4, having means for adjusting the relative distance between said upper and lower contact members.

8. The ground aeration device as defined in claim 1, said support arms being oriented at 60 degrees in relation to the horizon.

9. The ground aeration device as defined in claim 1, having stop means on said mounting bracket to maintain said support arms at 60 degrees in relation to the horizon.

10. The ground aeration device as defined in claim 1, said mounting brackets having a male component which is removably retained in a female component, such that one of said components to which said roller is attached can be removed.

11. The ground aeration device as defined in claim 1, said support arms being pivotally attached to said mounting bracket such that said roller may be moved from an operative position wherein said spikes engage a groundsurface to a transport position wherein said spikes are removed from said groundsurface.

12. A ground aeration device, comprising:
   a. a cylindrical roller having a plurality of spikes projecting therefrom, said spikes being aligned in a helical row which extends substantially once around the circumference of said roller;
   b. support arms having said roller rotatably secured to one end, said support arms having a protective guard attached thereto extending over said roller; and
   c. mounting brackets which are adapted to mount the opposed ends of said support arms to the front of a lawn mower, said mounting brackets having at least two "C" clamps with upper and lower contact members to permit attachment of said mounting bracket to said lawn mower, said mounting brackets having stop means to maintain said support arms oriented toward the ground at an angle of 60 degrees in relation to the horizon such that said spikes of said roller penetrate the underlying groundsurface, said support arms being pivotally attached to said mounting bracket such that said roller may be moved from an operative position wherein said spikes engage a groundsurface to a transport position wherein said spikes are removed from said groundsurface.

13. The ground aeration device as defined in claim 12, having pivotally adjustable upper contact members which engage and conform to the slope of the exterior surface of said lawn mower.

14. The ground aeration device as defined in claim 12, having means for lateral adjustment of the relative distance between said "C" clamps.

15. The ground aeration device as defined in claim 12, having means for adjusting the relative distance between said upper and lower contact members.

16. The ground aeration device as defined in claim 12, said mounting brackets having a male component which is removably retained in a female component, such that one of said components to which said roller is attached can be removed from said lawn mower.

17. A ground aeration device, comprising:
   a. a cylindrical roller having a plurality of spikes projecting therefrom, said spikes being aligned in a helical row which extends once around the circumference of said roller;

b. support means having said roller rotatably secured to one end, said support arm having a protective guard attached thereto extending over said roller; and c. mounting brackets which are adapted to mount the opposed ends of said support arms to the front of a lawn mower, said mounting brackets having at least two "C" clamps with upper and lower contact members to permit attachment of said mounting bracket to said lawn mower and means for adjusting the relative distance between said upper and lower contact members, said upper contact members being pivotally adjustable to engage and conform to the slope of the exterior surface of said lawn mower, said mounting brackets having means for lateral adjustment of the relative distance between said "C" clamps, said mounting brackets having stop means to maintain said support arms oriented toward the ground at an angle of 60 degrees in relation to the horizon such that said spikes of said roller penetrate the underlying groundsurface, said support arms being pivotally attached to said mounting bracket such that said roller may be moved from an operative position wherein said spikes engage a groundsurface to a transport position wherein said spikes are removed from said groundsurface.

18. The ground aeration device as defined in claim 17, said mounting brackets having a male component which is removably retained in a female component, such that one of said components to which said roller is attached can be removed from said lawn mower.

19. A ground aeration device, comprising:

a. a cylindrical roller having a plurality of spikes projecting therefrom, said spikes being aligned in a helical row which extends substantially once around the circumference of said roller;

b. support arms having said roller rotatably secured to one end, said support arms having a protective guard attached thereto extending over said roller;

c. a first mounting member adapted to be secured to the front of a lawn mower, said first mounting member having at least two "C" clamps with upper and lower contact members to permit attachment to said lawn mower and means for adjusting the relative distance between said upper and lower contact members, said upper contact members being pivotally adjustable to engage and conform to the slope of the exterior surface of said lawn mower, said first mounting member having means for lateral adjustment of the relative distance between said "C" clamps, said first mounting member having at least two vertically extending female couplings; and d. a second mounting member having at least two male couplings which are adapted to be received in said female couplings of said first mounting member, said second mounting member being secured to the opposed ends of said support arms, said second mounting member having stop means to maintain said support arms oriented toward the ground at an angle of 60 degrees in relation to the horizon such that said spikes of said roller penetrate the underlying groundsurface, said support arms being pivotally attached to said second mounting member such that said roller may be moved from an operative position wherein said spikes engage a groundsurface to a transport position wherein said spikes are removed from said groundsurface.

* * * * *

UNITED STATES PATENT AND TRADEMARK OFFICE
CERTIFICATE OF CORRECTION

PATENT NO. : 4,899,828

DATED : February 13, 1990

INVENTOR(S) : Clark Robin HARRIS

It is certified that error appears in the above—identified patent and that said Letters Patent is hereby corrected as shown below:

Column 5, line 39 - delete ",";

Column 5, line 39 - insert "in combination with a wheeled trolley, said device" before "comprising:";

Column 5, line 45 - insert "and" after "end;";

Column 5, line 46 - delete "are adapted to";

Column 5, line 47 - replace "mounted" with "mount";

Column 5, line 48 - delete "a";

Column 5, line 48 - insert "the" before "wheeled"; and

Column 5, line 54 - delete ", (such that said spikes of said roller penetrate the underlying ground surface)"

Signed and Sealed this

Nineteenth Day of March, 1991

*Attest:*

HARRY F. MANBECK, JR.

*Attesting Officer*  *Commissioner of Patents and Trademarks*